United States Patent
Hitch et al.

(10) Patent No.: US 7,128,686 B2
(45) Date of Patent: Oct. 31, 2006

(54) METHOD AND APPARATUS FOR SYNCHRONIZED PTO CONTROL IN A MOTOR VEHICLE POWERTRAIN

(75) Inventors: Ronald P. Hitch, Westfield, IN (US); William J. Wegeng, Avon, IN (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 10/877,937

(22) Filed: Jun. 25, 2004

(65) Prior Publication Data

US 2005/0288152 A1    Dec. 29, 2005

(51) Int. Cl.
*B60W 10/30*    (2006.01)

(52) U.S. Cl. ............................................. 477/53; 74/11
(58) Field of Classification Search ................. 477/53, 477/55, 56, 60
See application file for complete search history.

(56) References Cited

U.S. PATENT DOCUMENTS

| | | | | |
|---|---|---|---|---|
| 2,950,629 A | * | 8/1960 | Holdeman et al. | 477/125 |
| 4,955,851 A | * | 9/1990 | Arzoian et al. | 475/59 |
| 5,299,129 A | * | 3/1994 | Uchida et al. | 74/11 |
| 5,522,778 A | * | 6/1996 | Iwase et al. | 477/62 |
| 5,860,499 A | * | 1/1999 | Onimaru et al. | 74/15.86 |
| 6,938,512 B1 | * | 9/2005 | Tanikawa | 74/467 |

* cited by examiner

*Primary Examiner*—Sherry Estremsky
(74) *Attorney, Agent, or Firm*—Christopher DeVries

(57) ABSTRACT

One or more friction devices of a transmission coupled to an engine through a fluid coupling are used during engine neutral idle operation to control the state of the fluid coupling for synchronous engagement and disengagement of a PTO input gear with a transmission-driven gear. The fluid coupling includes an input member connected to the engine and an output member connected to the input shaft of the transmission, and the transmission friction devices temporarily ground the output member without mechanically coupling the transmission input and output shafts under specified enable conditions. This maintains the transmission input shaft in a stationary condition while an actuator engages or disengages the PTO input gear with the transmission-driven gear. Following engagement or disengagement of the PTO input gear, the friction devices are released to resume normal operation of the fluid coupling.

8 Claims, 2 Drawing Sheets

METHOD AND APPARATUS FOR SYNCHRONIZED PTO CONTROL IN A MOTOR VEHICLE POWERTRAIN

TECHNICAL FIELD

The present invention relates to the control of a motor vehicle powertrain including an internal combustion engine coupled to a power transmission through a fluid coupling, and more particularly to a control for synchronously engaging and disengaging a transmission-driven Power-Take-Off (PTO).

BACKGROUND OF THE INVENTION

Heavy duty motor vehicle transmissions are commonly configured to accept a Power-Take-Off (PTO) unit for operating various accessory devices such as winches and dump lifts. In a typical mechanization, the transmission includes a PTO drive gear coupled to the transmission input shaft, and the PTO drive gear is maintained in meshing engagement with an input gear of the PTO unit. The PTO input gear drives a PTO input shaft, and a dedicated hydraulic clutch in the PTO unit selectively couples the PTO input shaft to a PTO output shaft for engagement and disengagement of the PTO. However, this approach adds complexity and cost to the PTO unit, and tends to increase gear noise even when the PTO is not activated. Accordingly, what is needed is an improved way of selectively activating and deactivating the PTO function.

SUMMARY OF THE INVENTION

The present invention is directed to an improved method and apparatus for activating and de-activating a transmission-driven PTO, where the transmission is coupled to an engine through a fluid coupling such as a torque converter, and one or more of the transmission friction devices are activated during engine neutral idle operation to control the state of the fluid coupling for synchronous engagement and disengagement of a transmission-driven gear with a PTO input gear. The fluid coupling includes an input member connected to the engine and an output member connected to the input shaft of the transmission, and the transmission friction devices temporarily ground the output member without mechanically coupling the input and output shafts under specified enable conditions. This maintains the transmission input shaft in a stationary condition while an actuator engages or disengages the PTO input gear with the transmission-driven gear. Following engagement or disengagement of the PTO input gear, the friction devices are released to resume normal operation of the fluid coupling.

DESCRIPTION OF THE PREFERRED EMBODIMENT

Figures 1, 2:
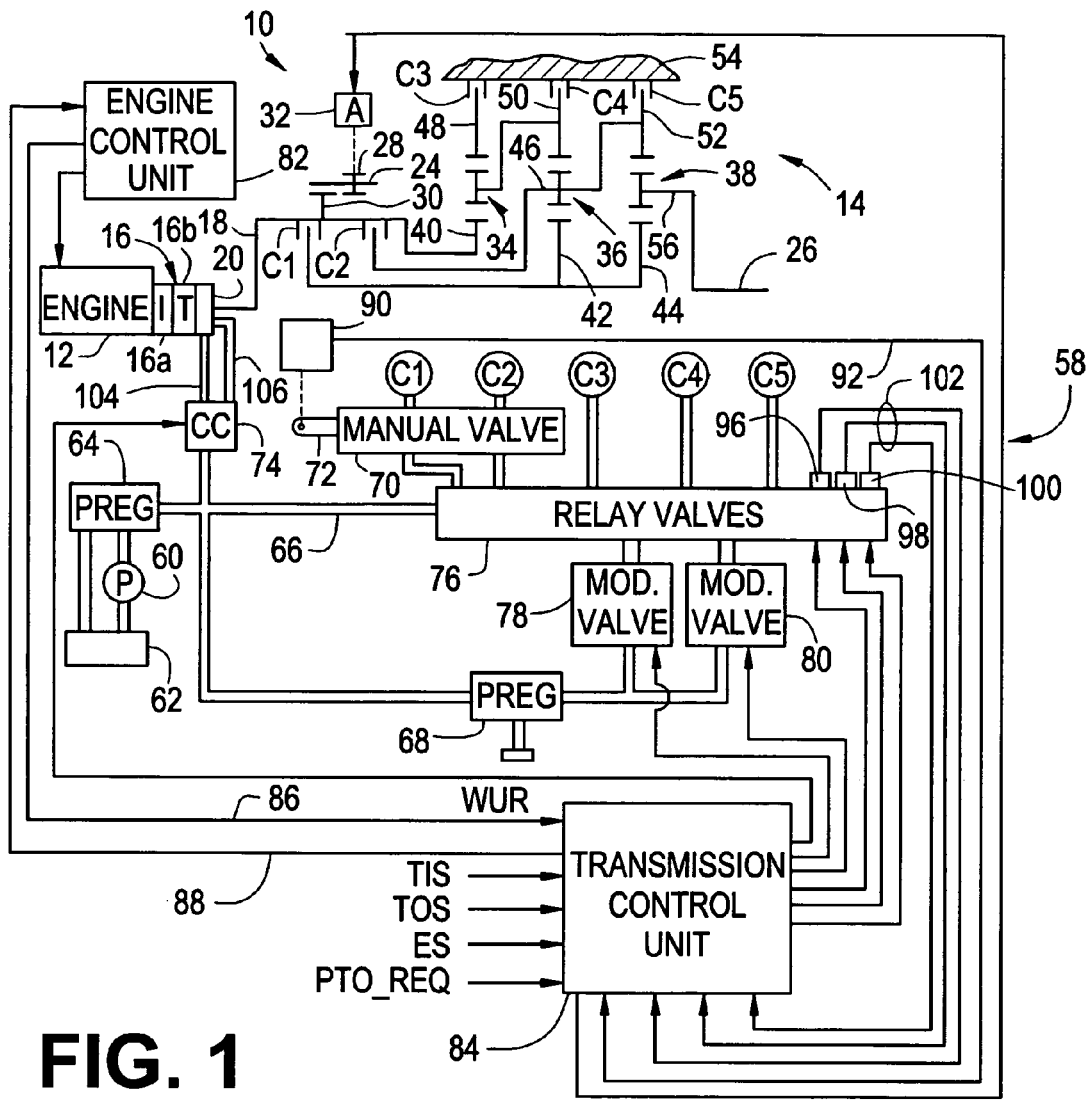
FIG. 1 is a diagram of a motor vehicle powertrain including an engine, a fluid coupling, an automatic transmission and PTO unit, and a microprocessor-based transmission control unit for carrying out a control according to the present invention.
FIG. 2 is a chart depicting the clutch states of the transmission of FIG. 1 for establishing various transmission speed ratios and the locked turbine mode of this invention.

Referring to FIG. 1, the method of the present invention is disclosed herein in the context of a motor vehicle powertrain 10 including an internal combustion engine (ENG) 12 and a multi-ratio power transmission 14 having a planetary gearset of the type described in the U.S. Pat. No. 4,070,927 to Polak and an electro-hydraulic control of the type described in U.S. Pat. No. 5,601,506 to Long et al., such patents being incorporated herein by reference. Accordingly, the gearset and control elements shown in FIG. 1 hereof have been greatly simplified, it being understood that further detail regarding the fluid pressure routings and so forth may be found in the aforementioned patents.

The engine 12 is coupled to the transmission 14 through a fluid coupling such as the torque converter 16. An input member or impeller (I) 16a of the torque converter 16 is connected to an output shaft of the engine 12 and an output member or turbine (T) 16b of the torque converter 16 is connected to an input shaft 18 of the transmission 14. While torque is ordinarily transferred through the torque converter 16 with slippage between the impeller 16a and turbine 16b, the powertrain 10 includes a torque converter clutch 20 that is selectively engaged under certain conditions to provide a mechanical coupling between engine 12 and transmission input shaft 18.

The transmission 14 includes a gear 30 (referred to herein as the transmission-driven gear or the PTO drive gear) continuously coupled to the input shaft 18. The input gear 28 of a PTO unit is coupled to a PTO input shaft 24 by a spline coupling that permits axial movement of the input gear 28 for selective engagement with the PTO drive gear 30. Movement of the PTO input gear 28 may be effected manually, but is preferably effected by an electromechanical or electro-hydraulic actuator (A) 32 as indicated in FIG. 1. Of course, some or all of the PTO elements such as the PTO input gear 28 and PTO input shaft 24 could be located within the transmission 14 instead of in a separate PTO unit, if desired.

The transmission 14 also includes a planetary gear arrangement for selectively coupling the input shaft 18 to a transmission output shaft 26. The planetary gear arrangement includes three inter-connected planetary gearsets 34, 36, 38 and a set of five friction devices or clutches designated as C1, C2, C3, C4 and C5. The input shaft 18 continuously drives a sun gear 40 of gearset 34, selectively drives the sun gears 42, 44 of gearsets 36, 38 via clutch C1, and selectively drives the carrier 46 of gearset 36 via clutch C2. The ring gears 48, 50, 52 of gearsets 34, 36, 38 are selectively connected to ground 54 via clutches C3, C4 and C5, respectively. The transmission output shaft 26 couples the driving wheels of the vehicle to the carrier 56 of gearset 38.

As diagrammed in FIG. 2, the state of the clutches C1–C5 (i.e., engaged or disengaged) can be controlled to provide six forward gears (1st–6th), a reverse (R) gear, a neutral (N) mode, or a locked-turbine (LT) mode according to the present invention. As indicated, clutches C1 and/or C2 are engaged during operation of the forward gears, and the clutch C5 is engaged during the neutral (N) mode. The clutch C3 is engaged along with clutch C5 to perform a neutral-to-reverse range shift, while the clutches C3 and C4 are engaged to establish the locked-turbine mode during which the turbine 16b of torque converter 16 is coupled to ground 54. To the engine 12, the locked-turbine mode is equivalent to stationary operation in a forward or reverse gear, but in this case, there is no driving connection between input shaft 18 and output shaft 26. Referring to FIG. 1, it will be seen that concurrently engaging clutches C3 and C4 locks the planetary gearset 34, thereby preventing rotation of the torque converter turbine 16b.

The establishment of a locked-turbine mode is unique to the present invention, and when invoked during engine idle while the transmission 14 is in the Neutral (N) mode allows synchronous engagement and disengagement of the PTO input gear 28 with the PTO drive gear 30 to activate and deactivate PTO functionality. When PTO activation is desired and the locked-turbine enable conditions have been met, clutches C3 and C4 are engaged to slow the torque converter turbine 16b to a stop. Once the actuator 32 has moved the PTO input gear 28 into engagement with the PTO drive gear 30, the clutches C3 and C4 are released, establishing a drive connection between the engine 12 and the PTO input shaft 24 through the torque converter 16. When PTO deactivation is desired and the locked-turbine enable conditions have been met, clutches C3 and C4 are engaged to slow the torque converter turbine 16b and PTO shaft 24 to a stop. Once the actuator 32 has moved the PTO input gear 28 out of engagement with the PTO drive gear 30, the clutches C3 and C4 are released, completing the PTO deactivation.

The torque converter clutch 20 and the transmission clutches C1–C5 are controlled by an electro-hydraulic control system, generally designated by the reference numeral 58. The hydraulic portions of the control system 58 include a pump 60 which draws hydraulic fluid from a reservoir 62, a pressure regulator 64 which returns a portion of the pump output to reservoir 62 to develop a regulated pressure in line 66, a secondary pressure regulator valve 68, a manual valve 70 activated by a driver-manipulated shift selector (not shown) via linkage arm 72 and a number of solenoid-operated fluid control valves 74, 76, 78, 80.

The electronic portion of the control is primarily embodied in the engine control unit (ECU) 82 and the transmission control unit (TCU) 84, illustrated in FIG. 1 as two separate modules. Both control units 82, 84 are microprocessor-based, and may be conventional in architecture. The ECU 82 controls the operation of engine functions depending on the control variables afforded by engine 12, and the TCU 84 controls the PTO actuator 32 and the solenoid operated fluid control valves 74, 76, 78, 80 based on a number of inputs to achieve a desired transmission speed ratio. The inputs to TCU 84 include signals representing the transmission input speed TIS, the transmission output speed TOS and engine speed ES. Sensors for developing such signals may be conventional in nature, and have been omitted for simplicity. Additionally, TCU 84 receives a PTO request input PTO_REQ which may be generated by an operator controlled switch, for example. Also, TCU 84 can receive engine data via line 86, and supply transmission status information to ECU 82 via line 88.

The linkage arm 72 of manual valve 70 is coupled to a sensor and display module 90 that produces a signal on line 92 based on the control lever position. Such signal is conventionally referred to as a PRNDL signal, since it indicates which of the transmission ranges (Park, Reverse, Neutral, Drive or Low) has been selected by the driver-manipulated shift selector. Finally, the fluid control valves (relay valves) 76 are provided with pressure switches 96, 98, 100 for supplying diagnostic signals to TCU 84 on lines 102 based on the respective relay valve positions. The TCU 84 monitors the various diagnostic signals for the purpose of electrically verifying proper operation of the controlled elements.

The solenoid operated fluid control valves 74, 76, 78, 80 are generally characterized as being either of the on/off or modulated type. The Relay Valves 76 comprise a set of three on/off valves that are utilized in concert with manual valve 70 to enable controlled engagement and disengagement of each of the clutches C1–C5 with only two modulated valves 78, 80. For any selected gear, TCU 84 activates a particular combination of Relay Valves 76 for coupling one of the modulated valves 78, 80 to the on-coming clutch, and the other modulated valve 80, 78 to the off-going clutch. The modulated valves 78, 80 each comprise a conventional pressure regulator valve biased by a variable pilot pressure that is developed by current controlled force motor. The fluid controlled valve (CC) 74 is also a modulated valve, and controls the supply fluid supply path to converter clutch 20 in lines 104, 106 for selectively engaging and disengaging the converter clutch 20.

The present invention is particularly directed to a control method carried out by TCU 84 for temporarily establishing the locked-turbine (LT) mode of transmission 14 during engine idle operation in Park or Neutral for permitting synchronous engagement of the PTO input gear 28 with the PTO drive gear 30. This eliminates the need for a dedicated PTO clutch since the friction devices used to establish the locked-turbine mode are already present in the transmission 14 for other reasons, and additionally eliminates the potential for gear noise that occurs in clutched systems where the PTO input gear 28 is continuously engaged with the PTO drive gear 30. Since the locked-turbine mode is only activated temporarily to facilitate PTO engagement and disengagement, the consequent heating of the torque converter fluid is insubstantial.

Figure 3:
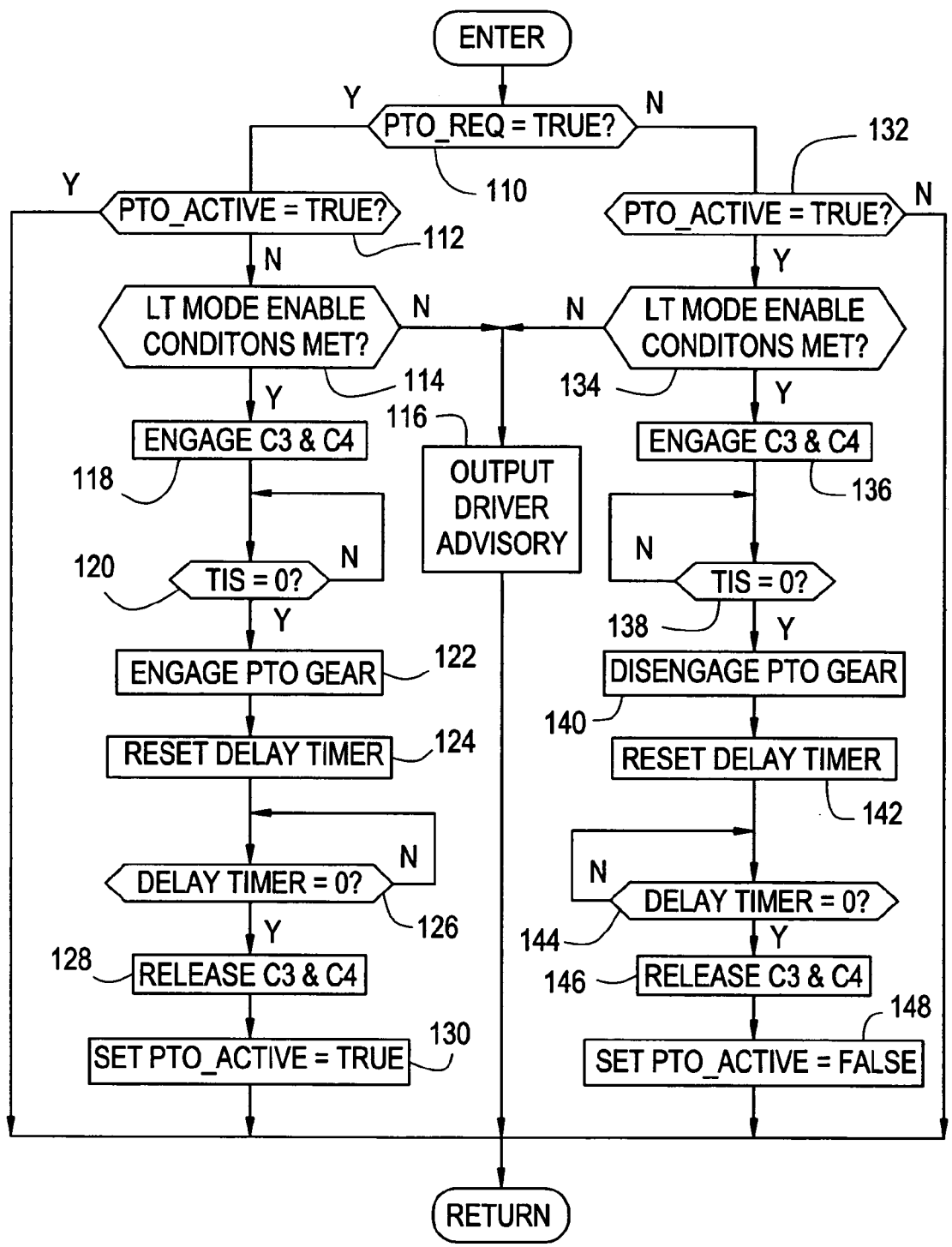
FIG. 3 is flow diagram representing a software routine carried out by the transmission control unit of FIG. 1 for temporarily locking an output member of the fluid coupling of FIG. 1 for synchronous engagement or disengagement of the PTO unit of FIG. 1.

The flow diagram of FIG. 3 represents a software routine periodically executed by TCU 84 according to this invention for utilizing the locked-turbine mode in response to transitions of the PTO_REQ input to facilitate PTO engagement and disengagement. Referring to FIG. 3, the block 110 is first executed to check the state of the PTO_REQ input. If PTO_REQ is TRUE, PTO operation is requested, and the block 112 determines if the PTO is already active, as indicated by the status of the PTO_ACTIVE flag. If PTO_ACTIVE is TRUE, the routine is exited; otherwise, the block 114 is executed to determine if the locked-turbine mode enable conditions are met. In a similar manner, the blocks 132 and 134 check the status of the PTO_ACTIVE flag and determine if the locked-turbine mode enable conditions are met when PTO_REQ is FALSE. If the enable conditions for the locked-turbine mode are not met in either case, the requested operation cannot be achieved, and the block 116 is executed to advise the vehicle operator by way of an indicator light or a more specific communication, completing the routine.

The locked-turbine mode enable conditions may include some or all of the following: (1) range selector in Park, (2) transmission output speed equal to zero, (3) engine speed below a threshold, (4) engine throttle position below a threshold, and (5) engine output torque below a threshold. Of course, the number and nature of the enable conditions will vary depending on signal availability, vehicle manufacturer preference, and other factors. Various hysteresis thresholds and/or timers may be employed in connection with one or more of the enable conditions as well.

If PTO_REQ is TRUE, the PTO_ACTIVE flag is FALSE and the enable conditions for the locked-turbine mode are met, the block 118 is executed to engage clutches C3 and C4 to initiate the locked-turbine mode. When block 120 detects that the transmission input shaft speed TIS has been reduced to zero, the block 122 activates the PTO actuator 32 to move the PTO input gear 28 into engagement with the PTO drive gear 30. Following a predetermined time delay established by a DELAY TIMER and the blocks 124 and 126, the blocks 128 and 130 are executed to release clutches C3 and C4 to resume normal torque converter operation and to set the PTO_ACTIVE flag to TRUE.

If PTO_REQ is FALSE, the PTO_ACTIVE flag is TRUE and the enable conditions for the locked-turbine mode are met, the block 136 is executed to engage clutches C3 and C4 to initiate the locked-turbine mode. When block 138 detects that the transmission input shaft speed TIS has been reduced to zero, the block 140 is activates the PTO actuator 32 to move the PTO input gear 28 out of engagement with the PTO drive gear 30. Following a predetermined time delay established by the DELAY TIMER and the blocks 142 and 144, the blocks 146 and 148 are executed to release clutches C3 and C4 to resume normal torque converter operation and to set the PTO_ACTIVE flag to FALSE.

In summary, the method of the present invention utilizes one or more friction devices of the transmission 14 to selectively ground the torque converter turbine 16b for purposes of engaging and disengaging the PTO input gear 28 with the PTO drive gear 30. The engagement and disengagement are carried out synchronously, and are virtually imperceptible to the operator of the vehicle. Gear noise is reduced because the PTO input gear 28 is not engaged with the PTO drive gear 30 during normal operation of the transmission 14, and the transmission cost and complexity are reduced compared with conventional approaches utilizing a dedicated PTO clutch.

While the present invention has been described with respect to the illustrated embodiment, it is recognized that numerous modifications and variations in addition to those mentioned herein will occur to those skilled in the art. For example, the powertrain components may be configured differently than shown herein, there may be various manufacturer-specified or user-specified PTO inhibit criteria, and so on. Also, the TCU 84 may be configured to permit asynchronous disengagement of the PTO input gear with the transmission output gear 30, in which case the locked turbine mode would only need to be used for PTO engagement. Accordingly, it is intended that the invention not be limited to the disclosed embodiment, but that it have the full scope permitted by the language of the following claims.

The invention claimed is:

1. A method of operation for a power transmission coupled to an engine through a fluid coupling, the transmission having an input coupled to an output member of the fluid coupling and to a PTO drive gear, the method comprising:
   detecting a neutral idle condition of said engine; and
   in response to a PTO activation request:
      activating at least one friction device of said power transmission to prevent rotation of said output member without establishing a drive connection between said output member and an output of said transmission;
      synchronously engaging a PTO input gear with said PTO drive gear; and
      deactivating said at least one friction device to drivingly couple said engine to said PTO input gear through said fluid coupling.

2. The method of claim 1, including:
   establishing enable conditions for activating said at least one friction device;
   activating said at least one friction device in response to said PTO activation request when said neutral idle condition is detected and said enable conditions are met.

3. The method of claim 1, including:
   maintaining the activation of said at least one friction device for a predetermined delay time before deactivating said at least one friction device.

4. The method of claim 1, including:
   detecting a PTO deactivation request while said neutral idle condition is detected;
   reactivating said at least one friction device to prevent rotation of said output member without establishing a drive connection between said output member and the output of said transmission;
   disengaging said PTO input gear with said output gear; and
   deactivating said at least one friction device to restore said fluid coupling to normal operation.

5. The method of claim 4, including:
   maintaining the reactivation of said at least one friction device for a predetermined delay time before deactivating said at least one friction device.

6. The method of claim 1, including:
   detecting a zero speed condition of the transmission input; and
   engaging said PTO input gear with said output gear when said zero speed condition is detected.

7. Apparatus for selectively driving a PTO input gear with a power transmission, the transmission having an input coupled to an output member of a fluid coupling and to a PTO drive gear, the apparatus comprising:
   a controller responsive to a PTO activation request during a neutral condition of said transmission for temporarily activating at least one friction device of said power transmission to prevent rotation of said output member without establishing a drive connection between said output member and an output of said transmission; and
   an actuator for engaging said PTO input gear with said PTO drive gear when a synchronous condition of such gears is achieved, whereby the PTO input gear is driven by said PTO drive gear upon deactivation of said at least one friction device.

8. The apparatus of claim 7, wherein:
   said controller is responsive to a PTO de-activation request during a neutral condition of said transmission for temporarily activating said at least one friction device to prevent rotation of said output member without establishing a drive connection between said output member and the output of said transmission, and commanding said actuator to disengage said PTO input gear from said PTO drive gear when a synchronous condition of such gears is achieved.

* * * * *